Patented June 5, 1923.

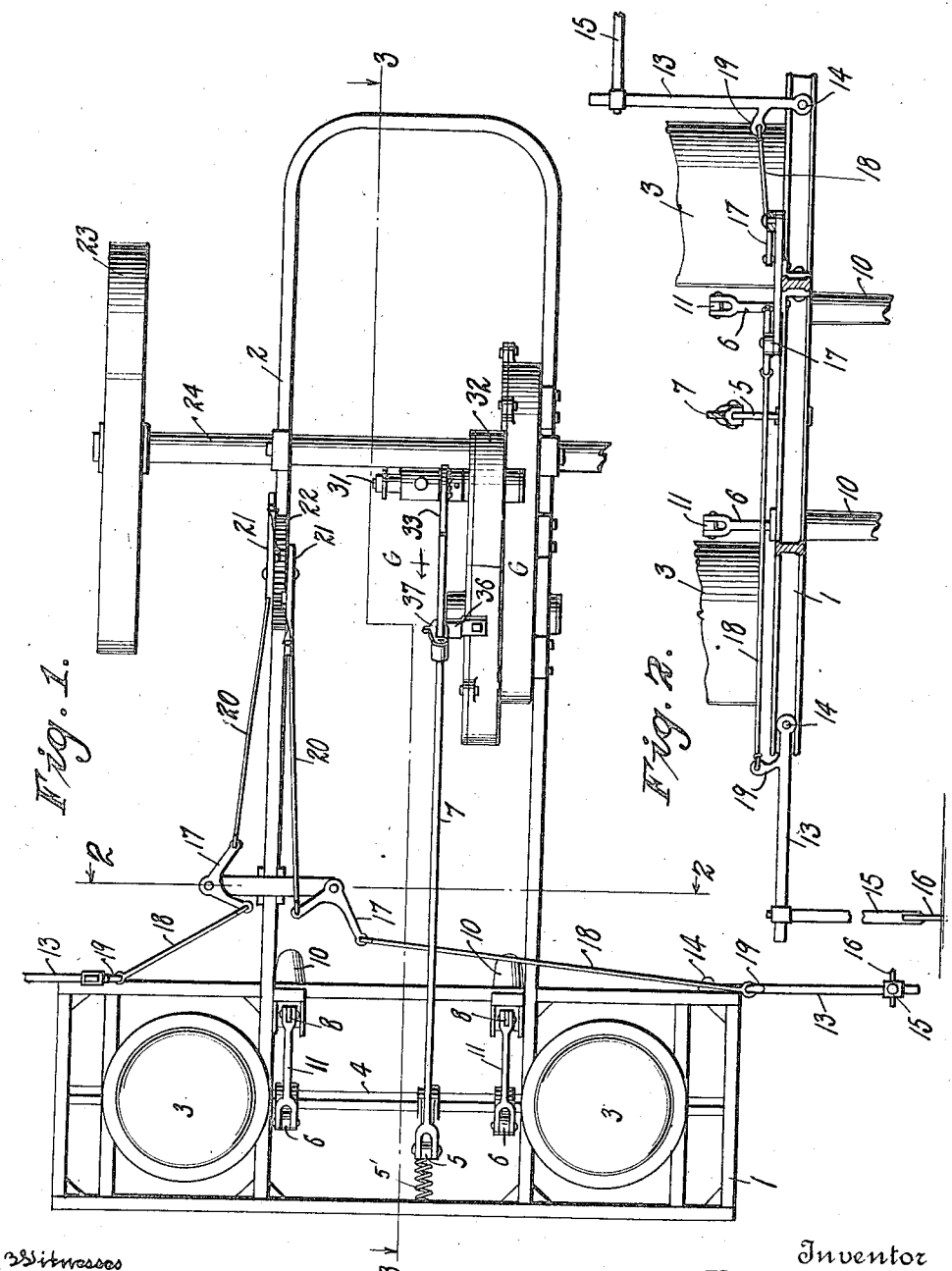

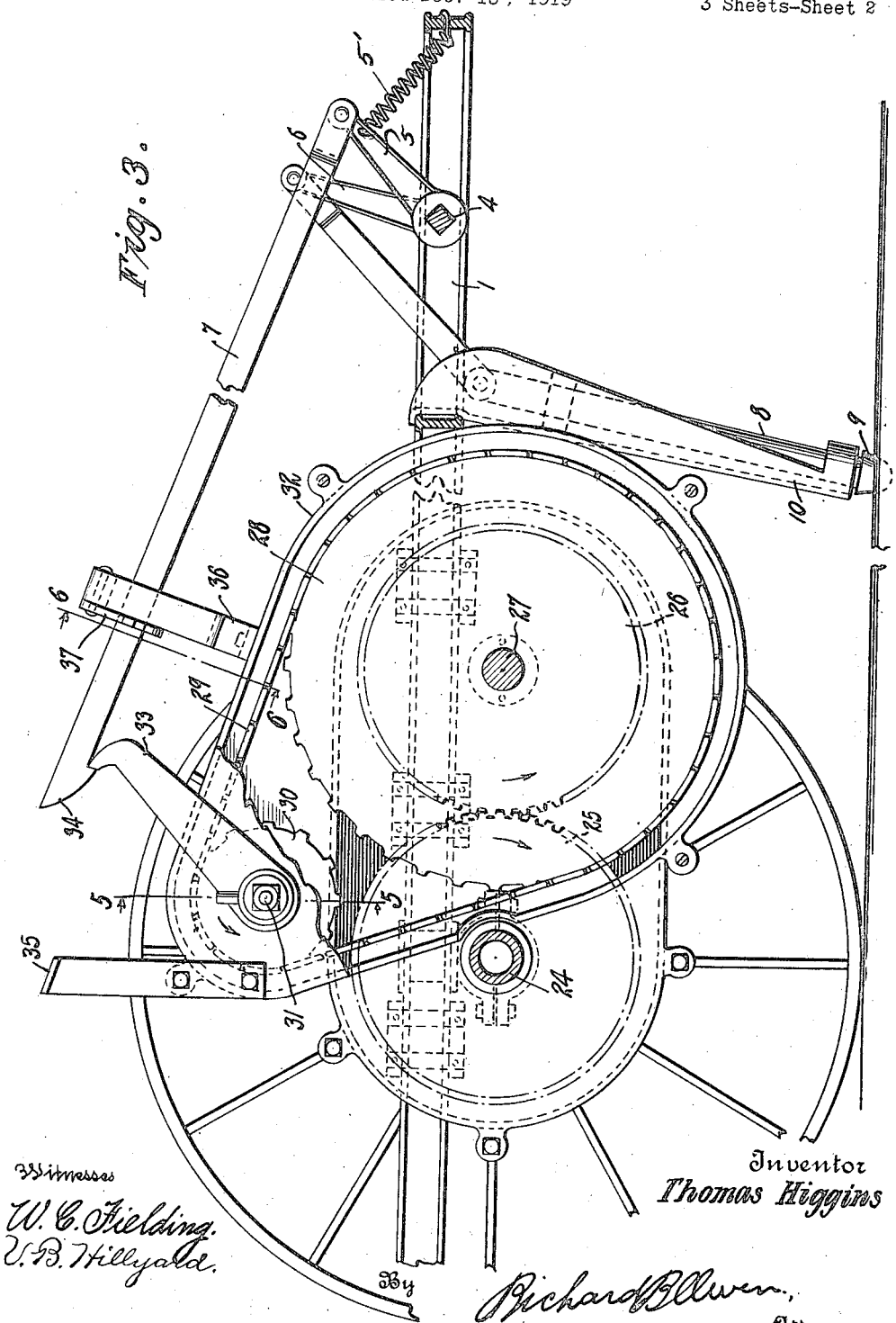

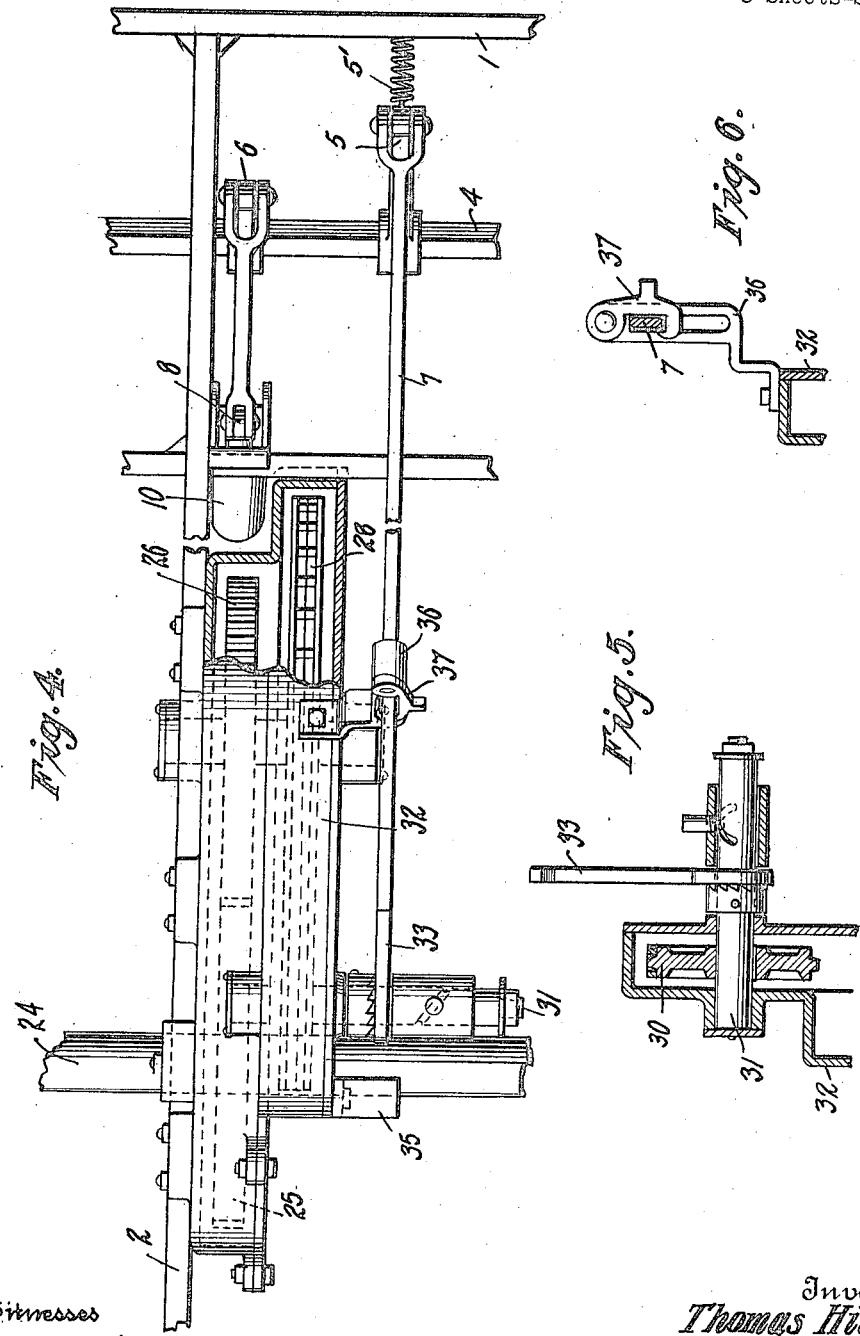

1,458,055

UNITED STATES PATENT OFFICE.

THOMAS HIGGINS, OF DAVENPORT, IOWA.

CHECKROW CORN-PLANTER ATTACHMENT.

Application filed December 15, 1919. Serial No. 345,048.

*To all whom it may concern:*

Be it known that I, THOMAS HIGGINS, a citizen of the United States, residing at Davenport, in the county of Scott and State of Iowa, have invented certain new and useful Improvements in Checkrow Corn-Planter Attachments, of which the following is a specification.

The present invention relates to agricultural implements of the type for sowing grain, being particularly designed for planting corn in check rows without the necessity of employing the usual check line.

The invention relates more particularly to indicating means whereby the rows are properly spaced and the hills indicated so that proper spacing may be provided to insure cultivation after the plants have matured to such an extent as to require loosening of the earth and a hilling of the same.

The drawings illustrate a preferred embodiment of the invention. However, it is to be understood that in adapting the same to meet different conditions, various changes in the form, proportion and minor details of construction may be resorted to without departing from the nature of the invention as claimed hereinafter.

The drawings illustrate an attachment to a corn planter of approved construction provided with indicating means embodying the invention, and on reference thereto.

Figure 1 is a top plan view of attachment and planter a portion being broken away, Figure 2 is a sectional detail on the line 2—2 of Fig. 1 looking to the front as indicated by the arrows.

Figure 3 is a vertical central longitudinal section on the line 3—3 of Fig. 1 looking in the direction of the arrows and showing the parts on a larger scale, Figure 4 is a detail view showing more clearly the actuating mechanism, Figure 5 is a sectional detail showing more particularly the clutch means whereby the actuating mechanism is thrown into and out of gear, and Figure 6 is a sectional detail on the line 6—6 of Fig. 1 showing the parts on a larger scale.

Corresponding and like parts are referred to in the following description and indicated in the several views of the drawings by like reference characters.

The attachment illustrated is shown to demonstrate the application of the invention and comprises the usual runner frame 1 and wheel frame 2, the runner frame supporting the feeding mechanism and the wheel frame being provided with the actuating mechanism and receiving the usual driver's seat, not shown. The runner frame is provided with two hoppers 3 which are adapted to receive the grain and which are provided with any ordinary seed dropping mechanism, not shown. A shaft 4 is common to both of the hoppers 3 and actuates the seed dropping mechanism thereof. The shaft 4 is provided with a middle arm 5 and side arms 6. These arms are secured to the shaft 4 so as to turn therewith. The shaft 4 is adapted to have a rotary movement imparted thereto and is utilized for actuation of the seed dropping mechanism and the indicating means for marking the hills. The driving power is applied to the shaft 4 through the arms 5 by means of a rod, bar or like part 7.

A marker is provided for each of the hoppers 3 and is disposed to designate the hill, and the grain is deposited so that the attachment may be adjusted to insure transverse alining of the hills which is essential to admit of the plants being properly cultivated. Each of the markers comprises a shank 8 and a foot 9 the latter being approximately 4 inches long, of rounded form so as to indent the soil in a manner to make plain the proper hill in which the seed has been deposited. The marker is mounted in a suitable guide 10 which is secured at its upper ends to a transverse bar of the frame 1. The guide 10 extends from the frame 1 and is of such construction as to insure proper positioning and operation of the marker. A link 11 connects the upper end of each marker with an arm 6. The parts are so proportioned and arranged as to admit of the marker being reciprocated vertically as the shaft 4 is rocked. It will be understood that the operating power is applied to the shaft 4 in the manner stated and movement of the shaft actuates both the seed dropping mechanism and the markers, the parts being so disposed and arranged as to insure proper indication of the hills, which is essential to the setting of the attachment whereby to insure dropping the grain in check rows.

It is desired that the rows be properly spaced and for this purpose arms 13 are pivotally connected at their inner ends to a transverse bar of the runner frame 1 as indicated at 14. Each of the arms 13 is provided with a standard 15 supplied at its lower end with an arrow 16 which is an indicator, adapted to hang over the indentation made by the foot 9 at any time. There are two starting guide indicators. When the planter is travelling across the field the indicators are both out of operative position while the machine is in action. As the planter recrosses the field the indicator is let down upon the side needed over the row just planted, and hangs over the indentation made by the foot 9 showing the correct line of the starting point. Indicator can be used in center of field in case of mishap showing proper alinement over 9. A crank 17 co-operates with each indicator and one arm thereof is connected by means of a rod 18 with a projection 19 of the arm 13. The other arm of the bell crank 17 is connected by means of a link 20 with an operating lever 21 pivotally mounted upon the wheel frame and extending within convenient reach of the driver's seat. Each of the operating levers 21 is provided with a hand latch to co-operate with a toothed segment whereby the operating levers may be held in adjusted position. Proper manipulation of the levers 21 permits the starting guide indicator to be thrown into and out of an operative position.

The wheel frame 2 is supported upon ground wheels 23 which is mounted upon an axle 24 in any usual way so as to impart rotary movement thereto when the planter is advanced over the field. A gear wheel 25 is secured to the axle 24 so as to rotate therewith and meshes with a gear wheel 26 secured to the stub axle 27 disposed parallel with the axle 24. A sprocket wheel 28 is secured to the stub axle 27 so as to rotate therewith and a sprocket chain 29 connects the sprocket 28 with a sprocket wheel 30 secured to a shaft 31 arranged parallel with the axle 24 and stub shaft 27. The gearings and sprockets and chain, are suitably enclosed in a housing 32. The trip arm 33 which is mounted upon the shaft 31 is adapted to be thrown into and out of clutch engagement. Any suitable means may be provided for turning the trip arm 33 into or out of clutch engagement with the operating mechanism. The outer end of the trip arm 33 is adapted to positively engage the rear end of the rod, bar or connection 7 to impart a movement thereto to effect a rocking of the shaft 4 and intermittent actuation of the seed dropping and hill indicating mechanisms. The spring 5' disposed between the arm 5 and frame 1 tends to return and retain the arm in its initial position as shown to advantage in Figure 3. The outer or rear end of the bar 7 is curved as indicated at 34 so as to engage and ride upon an incline 35 whereby disengagement is effected between the bar 7 and the trip arm 33. The bar 7 when released from the trip arm 33 returns to normal position together with the seed dropping mechanism and the hill indicating mechanism. The trip arm 33 continues to rotate and at a point in its revolution again engages the bar 7 and moves the same to effect operation of the seeding and hill marking mechanisms. The trip arm 33 passes beneath the incline 35 whereas the pivotal end of the bar 7 rides on said incline thereby insuring separation of the bar 7 and arm 33. A standard 36 is secured to the housing 32 and is vertically slotted to receive the bar 7. A latch 37 pivoted to the standard 36 is adapted to engage the bar 7 and hold it clear of the trip arm 33 and thereby prevent operation of the seeding mechanism and the hill marking mechanism during movement of the planter from one place to another when it is not desired to have the same operate.

When the planter is advanced over the field and the trip arm 33 is in gear, the feeding mechanism and the hill markers are intermittently actuated. When the planter reaches the end of the field, and it is turned preliminary to recrossing, the marker 16 is swung downwardly so as to overhang the indentation made by the shoe 9 in its previous path of travel across the field. In this way the machine may be kept in proper alinement by causing the marker to keep in proper line with the indentation made by the shoe or foot 9. The machine is so adjusted as to insure subsequent hills alining transversely with the previous hills whereby the rows aline transversely so that proper provision is had for cultivation of the plants when required.

Having thus fully described my invention what I claim as new and desire to secure by Letters Patent is:—

1. In a check row planter attachment, the combination with a frame, a rock shaft supported thereby, marking mechanism adapted to be actuated by said rock shaft, an operating bar carried by said rock shaft and extending substantially longitudinally of said frame, said bar provided with a curved outer end, and having an offset portion constituting an abutment, a trip arm mounted upon said frame, means for swinging said trip arm, said trip arm adapted to engage the outer end of said bar for moving the same longitudinally of said frame, an upstanding releasing member having an inclined upper face for engaging the curved outer end of said bar and automatically releasing the same from engagement with said trip arm when said bar has travelled a predetermined distance, and means to return the operating bar to an operative position.

2. In a check row planter attachment, the combination with a frame, a rock shaft supported thereby, marking mechanism actuated by said rock shaft, a crank arm extending from said rock shaft, an operating bar pivotally attached to the end of said crank arm and extending substantially longitudinally of said frame, said bar provided with a curved outer end and having an offset portion constituting an abutment, a trip arm mounted on said frame, means for swinging said trip arm, said trip arm adapted to engage the outer end of said bar for moving the same longitudinally of said frame, an upstanding releasing member having an inclined upper face for engaging the curved outer end of said bar and automatically releasing the same from engagement with said trip arm when said bar has traveled a predetermined distance, and a spring attached to the crank arm for rocking the shaft to its original position.

In testimony whereof I affix my signature in presence of two witnesses.

THOMAS HIGGINS.

Witnesses:
MARIE GARVEY,
JOE RITZE.